(12) United States Patent
Roy

(10) Patent No.: US 6,442,891 B1
(45) Date of Patent: Sep. 3, 2002

(54) TREE BRACE

(76) Inventor: James Roy, 265 Highway B, Spickard, MO (US) 64679

( * ) Notice: Subject to any disclaimer, the term of this patent is extended or adjusted under 35 U.S.C. 154(b) by 0 days.

(21) Appl. No.: 09/917,047

(22) Filed: Jul. 27, 2001

Related U.S. Application Data

(60) Provisional application No. 60/239,333, filed on Oct. 10, 2000.

(51) Int. Cl.$^7$ ................................................ A01G 17/14
(52) U.S. Cl. ................................................ 47/42; 47/43
(58) Field of Search ................................ 47/42, 43, 44

(56) References Cited

U.S. PATENT DOCUMENTS

| | | | | |
|---|---|---|---|---|
| 2,293,336 A | * | 8/1942 | Groothedde | 47/42 |
| 2,296,217 A | * | 9/1942 | Maloney | 47/42 |
| 4,319,428 A | * | 3/1982 | Fox | 47/42 |

FOREIGN PATENT DOCUMENTS

| | | | | |
|---|---|---|---|---|
| JP | 06197646 A | * | 7/1994 | A01G/17/14 |

* cited by examiner

*Primary Examiner*—Peter M. Poon
*Assistant Examiner*—Joan Olszewski
(74) *Attorney, Agent, or Firm*—Chase Law Firm, L.C.

(57) ABSTRACT

A tree brace applies corrective forces to a part of a tree, such as the trunk, to straighten undesired bends or other deformities. A turnbuckle device applies force at a desired point of application, and is held by flexible lines that extend to locations above and below the application point. The turnbuckle is adjusted as the tree responds to the forces exerted thereon. The tree brace does not require a pole or stake for support, and can be placed on a tree wherever a bend or other deformity needs to be straightened.

7 Claims, 2 Drawing Sheets

TREE BRACE

CROSS-REFERENCE TO RELATED APPLICATION

This application claims benefit of U.S. Provisional Application No. 60/239,333, filed Oct. 10, 2000.

BACKGROUND OF THE INVENTION

This invention relates to braces for straightening trees and, in particular, to a brace that does not require a pole or stake for support and can be placed on a tree wherever a bend or other deformity needs to be straightened.

Young trees are typically staked to hold the trunk upright during early growth and to prevent a newly planted tree from blowing over in the wind. However, the stakes require continual adjustment and replacing as the soil loosens in response to a heavy rain and the tie lines between the stakes and the trunk either loosen in time or become too tight. Furthermore, the conventional approach is typically limited to applying a pulling force to the trunk in one or more directions because the lines tied to the stakes are flexible members in tension and thus can only pull the trunk toward the stake to which they are tied.

SUMMARY OF THE INVENTION

It is, therefore, the primary object of the present invention to provide a tree brace which does not utilize a pole or stake set in the ground, and can be applied to the tree wherever needed to straighten an undesired bend in the trunk.

Another important object of the invention is to provide such a brace that is supported only by the tree and can both pull on the trunk and push against it in order to apply the necessary corrective forces.

Still another important object is to provide a tree brace that utilizes a turnbuckle device mounted in an essentially horizontal position and secured to the tree by flexible lines above and below the device so that proper corrective forces are applied and adjustment, as the tree responds to such forces, is easily accomplished by operating the turnbuckle.

Yet another important object is to provide a bracing structure that can be applied as needed to straighten multiple bends in the same tree, by the application of more than one tree brace as needed to straighten the bends.

Other objects will become apparent as the detailed description proceeds.

DESCRIPTION OF THE PREFERRED EMBODIMENT

Figure 1:
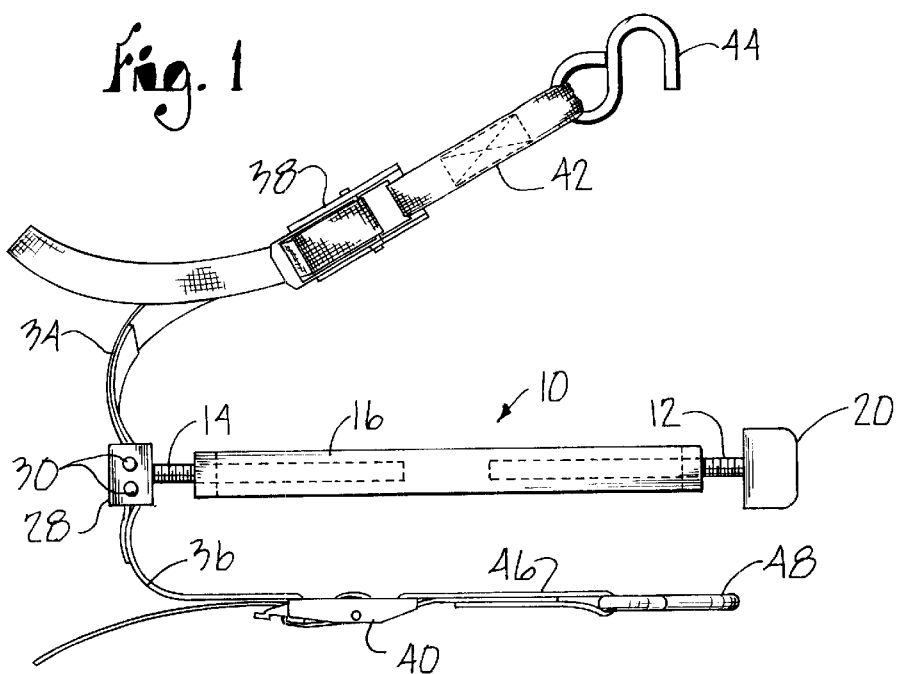
FIG. 1 is a side elevational view of the turnbuckle and associated structure of the tree brace, and illustrates the flexible lines attached to the head of the turnbuckle.
Figure 2:
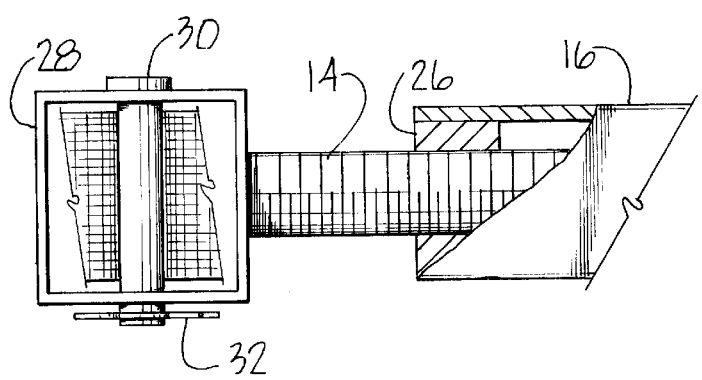
FIG. 2 is an enlarged, fragmentary, bottom view of the turnbuckle device shown in FIG. 1, parts being broken away for clarity.
Figure 3:
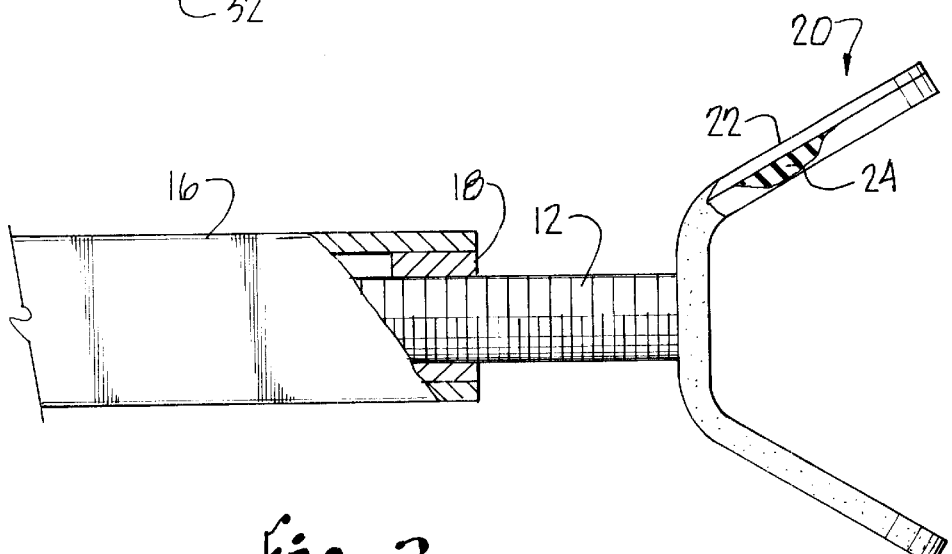
FIG. 3 is an enlarged, fragmentary, top plan view of the tail end of the turnbuckle device, parts being broken away to reveal details of construction.

Referring initially to FIGS. 1–3, the tree brace of the present invention includes a turnbuckle device 10 having a tail end 12 and a head end 14, each of which is presented by a threaded shaft that extends axially into an elongated turnbuckle barrel 16 which, as illustrated, may be formed from a length of square steel tubing. A nut 18 in the tail end of barrel 16 is secured in place by welding or other means and receives the tail shaft 12 as shown in FIG. 3. A generally C-shaped saddle member 20 is affixed to the outer end of shaft 12 and may comprise a thin metal plate 22 bent as desired to fit a tree trunk and provided with a rubber covering 24 on its inner face secured thereto by contact cement or other suitable means. A yieldable covering may also be applied to plate 22 by a dipping process.

The head shaft 14 is similarly mounted in barrel 16 as shown in FIG. 2, a nut 26 being secured in the adjacent end of barrel 16 for receiving and holding shaft 14. Reverse threads are employed on shafts 12 and 14 so that rotation of barrel 16 by hand about its longitudinal axis in one direction causes shafts 12 and 14 to extend from barrel 16, whereas rotation in the opposite direction causes shafts 12 and 14 to retract.

A head piece 28 is secured to the outer end of shaft 14 and comprises a short segment of steel tubing that serves as a mount for a pair of spaced pins 30, each held by a cotter pin 32. Flexible and upper and lower straps 34 and 36 of nylon or other suitable material are secured to the pins 30 and are provided with adjustable buckles 38 and 40, respectively, so that the length of each strap can be adjusted as necessary. A short flexible link 42 connects buckle 38 to an S-hook 44, and a similar link 46 connects buckle 40 to an S-hook 48.

Figure 4:
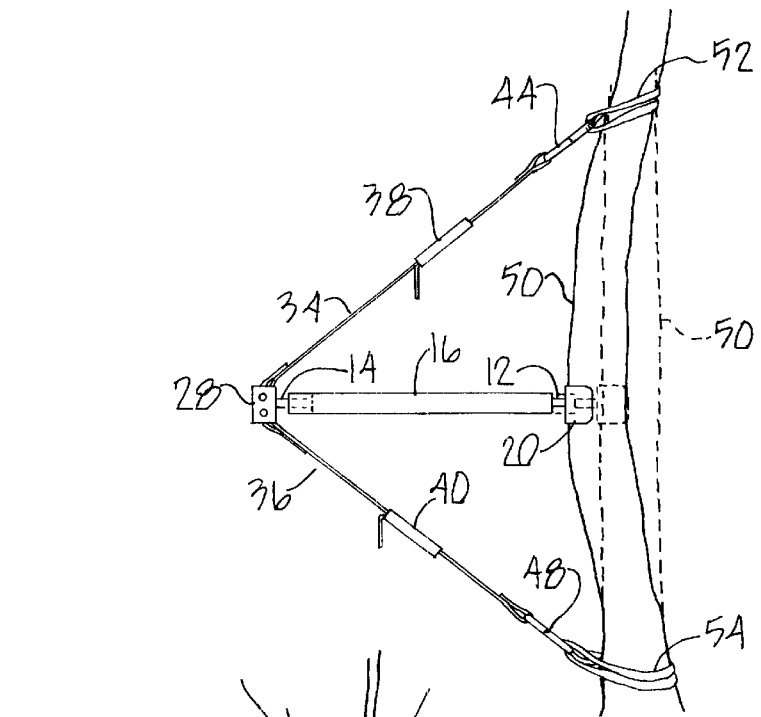
FIG. 4 is a side elevational view showing installation of the brace of the present invention on the trunk of a tree at a bend to be straightened.
Figure 5:
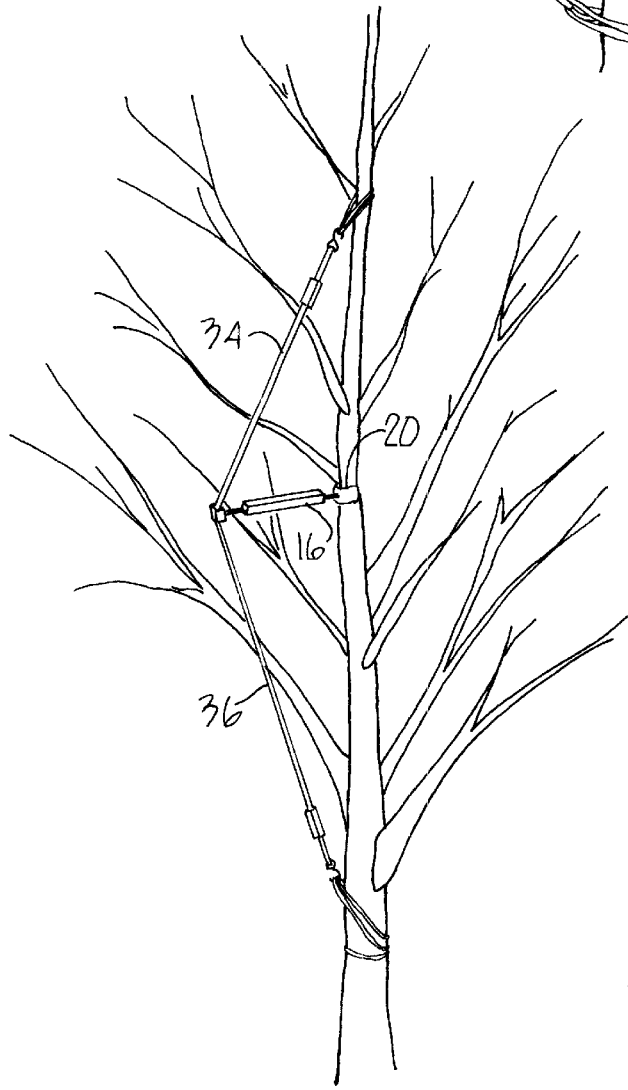
FIG. 5 is a perspective view showing the brace installed on the trunk of a tree, and illustrates placement of the brace among tree limbs.

Installation and use of the brace of the present invention is illustrated in FIGS. 4 and 5. In FIG. 4 it may be appreciated that the brace is applied to tree trunk 50 at a bend to be straightened. The saddle member 20 receives the tree trunk at the point on the bend to which pressure is to be applied. The rubber covering 24 (FIG. 3) prevents damage to the tree. The turnbuckle barrel 16 is loosely adjusted to permit a releasable loop 52 to be passed around the trunk at a location spaced above member 20, and a releasable loop 54 to be placed around the trunk at a location below member 20. The S-hooks 44 and 48 connect to the releasable loops, buckles 38 and 40 are tightened, and barrel 16 is rotated in a direction to extend the shafts 12 and 14 until the desired amount of force is applied to the bend. Note that in the installed position that the turnbuckle barrel 16 extends horizontally from the tree, and that the straps 34 and 36 and associated components provide flexible connecting lines extending from the tail of the turnbuckle to the upper and lower locations defined by the securing loops 52 and 54.

As a tree responds to the forces exerted by the brace, the trunk 50 deflects to the right as viewed in FIG. 4 and ultimately assumes the straightened position shown in broken lines. This is accomplished by repeatedly adjusting the turnbuckle over a period of days or weeks as necessary to accommodate the gradual movement of the trunk from the solid to the broken line position. This is easily done in the present invention by simply periodically rotating the turnbuckle barrel 16 by hand to extend the head and tail shafts 14 and 12. Once straightening is accomplished, the brace is removed.

FIG. 5 is another illustration of an installation of the brace and shows that it can be easily positioned so as to avoid interference by the limbs of the tree. The use of the flexible lines facilitates usage of the brace at points on the tree which would otherwise be unaccessible due to interfering limbs. Furthermore, it may be appreciated that two or more braces may be installed on a tree as needed to straighten multiple bends.

It should also be understood that although the preferred embodiment has been described as being of heavy duty construction, lighter weight materials such as aluminum and plastic may be used and the braces may be of various sizes in order to accommodate very young trees that cannot bear significant weight as well as larger trees as illustrated herein.

Having thus described the invention, what is claimed as new and desired to be secured by Letters Patent is as follows:

1. A tree brace comprising:

an elongated device having opposing head and tail ends and operating means adapted for moving said ends outwardly away from each other and inwardly toward each other, a shaped member on said tail end for receiving a part of a tree, a plurality of lines secured to said head end and adapted to extend away from said head end when the device is operatively positioned on tree, and means for releasably securing said lines to the tree at locations where employment of said operating means causes the application of corrective forces to the part of the tree engaged by tree brace.

2. A tree brace comprising:

a turnbuckle device having opposite, head and tail ends and operating means adapted for manual rotation for moving said ends outwardly away from each other upon rotation in one direction, and inwardly toward each other upon rotation in the opposite direction, a generally C-shaped member on said tail end for receiving a part of a tree when the device is positioned on a tree in a substantially horizontal position with said head end spaced outwardly therefrom, a pair of flexible lines secured to said head end and adapted to extend in generally opposing directions from said head end to said tree part when the device is positioned on a tree, and means for releasably securing said lines to said tree at locations where rotation of said operating means in said one direction applies corrective forces to said tree part.

3. A tree brace comprising:

a turnbuckle device having opposite head and tail ends, each of which is presented by a threaded shaft that extends axially into an elongated turnbuckle barrel, thereby providing operating means adapted for manual rotation for moving said ends outwardly away from each other upon rotation in one direction, and inwardly toward each other upon rotation in the opposite direction, a saddle member on said tail end for receiving a trunk of a tree when the device is positioned on a tree with said head end spaced outwardly away from the trunk, a pair of flexible lines secured to said head end and adapted to extend upwardly and downwardly from said head end to the trunk when the device is positioned on a tree in a substantially horizontal position, and means for releasably securing said lines to the trunk at points of attachment respectively above and below said saddle member, whereby rotation of said operating means in said one direction applies corrective forces to the trunk by pulling at said points of attachment and pushing against the trunk with said saddle member.

4. The tree brace as claimed in claim 3, wherein said saddle member has a rubber covering on a face thereof contacting said tree member.

5. The tree brace as claimed in claim 3, wherein said flexible lines comprise flexible straps of weather resistant material.

6. The tree brace as claimed in claim 3, wherein each of said flexible lines is provided with means for adjusting the length thereof.

7. The tree brace as claimed in claim 3, wherein said means for releasably securing said lines comprises, for each of said lines:

a short flexible link attached to said flexible line, a hook attached to said link, and a releasable loop adapted to be passed around said tree trunk and received by said hook.

* * * * *